(12) United States Patent
Fichou et al.

(10) Patent No.: US 6,690,646 B1
(45) Date of Patent: Feb. 10, 2004

(54) NETWORK CAPACITY PLANNING BASED ON BUFFERS OCCUPANCY MONITORING

(75) Inventors: Aline Fichou, La Colle s/Loup (FR); Claude Galand, La Colle s/Loup (FR); Jean-Francois Le Pennec, Nice (FR)

(73) Assignee: International Business Machines Corporation, Armonk, NY (US)

(*) Notice: Subject to any disclaimer, the term of this patent is extended or adjusted under 35 U.S.C. 154(b) by 673 days.

(21) Appl. No.: 09/603,710

(22) Filed: Jun. 27, 2000

(30) Foreign Application Priority Data

Jul. 13, 1999 (EP) .............................................. 99480062

(51) Int. Cl.[7] .............................................. H04L 12/54
(52) U.S. Cl. .................... 370/231; 370/252; 370/395.1; 370/412; 709/220; 709/223; 709/232; 709/238
(58) Field of Search ................................ 370/229, 230, 370/231, 235, 236, 237, 252, 253, 351, 389, 395.1, 400, 412, 413, 428, 429; 709/220, 223, 224, 232, 238

(56) References Cited

U.S. PATENT DOCUMENTS

| 5,319,638 A | * | 6/1994 | Lin .............................. 370/235 |
| 5,402,416 A | * | 3/1995 | Cieslak et al. .............. 370/236 |
| 5,935,213 A | * | 8/1999 | Rananand et al. .......... 709/234 |
| 6,452,901 B1 | * | 9/2002 | Yang et al. ................. 370/231 |
| 6,621,800 B1 | * | 9/2003 | Klien ......................... 370/282 |

FOREIGN PATENT DOCUMENTS

| EP | 0879232 A2 | 2/1999 | .......... H04L/12/56 |
| WO | WO 97/01143 | 1/1997 | .......... G06F/17/00 |

OTHER PUBLICATIONS

Manthorpe, S., et al.; "A Simulation Study of Buffer Occupancy in the ATM Access Network: Are Renewal Assumptions Justified?"; Proceedings of the Int'l Tele–Traffic Congress, NL, Amsterdam, N. H.; Jun. 19, 1991; vol. Congress 13, pp. 801–805.

Collier, B.R., et al.; "Traffic Rate and Shape Control with Queue Threshold Congestion Recognition"; IEEE Int'l Conference on Communications (ICC); Jun. 23, 1996; U.S., New York; pp. 746–750.

* cited by examiner

*Primary Examiner*—Alpus H. Hsu
*Assistant Examiner*—Roberta Stevens
(74) *Attorney, Agent, or Firm*—John R. Pivnichny; Bracewell & Patterson, L.L.P.

(57) ABSTRACT

A method and a system of network capacity planning for use in a high speed packet switching network. The network comprises a plurality of switching nodes interconnected through a plurality of communication links, each of the switching nodes comprises means for switching packets from at least one input link to at least one output link. Each of the output links is coupled to at least one buffer in the switching node for queuing packets before they are transmitted over the output link. In each of the switching nodes and for each of the output links, a time distribution of the occupancy of each buffer during a predetermined monitoring time period is measured, and stored in a centralized memory location. Then, the buffer occupancy time distribution data are retrieved from the centralized memory location in all the switching nodes, gathered and stored in a network dedicated server. These buffer occupancy time distribution data for all the nodes are transmitted from the dedicated network server to a network monitoring center. In the network monitoring center, the buffer occupancy time distribution data are integrated on a larger time scale, and stored. Finally, the integrated buffer occupancy time distribution data are used to apply network capacity planning actions to the network resources.

13 Claims, 8 Drawing Sheets

| ACTION 1: | REROUTE CONNECTIONS |
| --- | --- |
| ACTION 2: | BOARD NO CONNECTION |
| ACTION 3: | KEEP LINK MONITORED |
| ACTION 4: | BOARD NO BURSTY CONNECTION |
| ACTION 5: | BOARD BURSTY CONNECTIONS IF CONDITION |
| ACTION 6: | BOARD NON-BURSTY CONNECTIONS |
| ACTION 7: | BOARD NON-BURSTY CONNECTIONS IF CONDITION |
| ACTION 8: | BOARD ANY CONNECTION |

*Fig. 7B*

NETWORK CAPACITY PLANNING BASED ON BUFFERS OCCUPANCY MONITORING

CROSS REFERENCE TO RELATED APPLICATION

This application claims priority from European application 99480062.1, filed Jul. 13, 1999 (MM/DD/YY), which is hereby incorporated by reference. The contents of the present application are not necessarily identical to the contents of the priority document.

BACKGROUND OF THE INVENTION

1. Technical Field

The invention relates to high-speed packet switched networks. More particularly, the invention relates to an efficient method and system of network capacity planning which relies on a close monitoring of the occupancy of buffers in the network nodes.

2. Description of the Related Art

The emergence of high speed networking technologies such as ATM cell-based or Frame Relay based technologies, now makes possible the integration of multiple types of traffic having different quality of service requirements (QoS), like speech, video and data, over the same communication network, which is often referred to as a "broadband" network. The communication circuits which may be shared in such network include transmission lines, program controlled processors, nodes or links, and data or packets buffers. Traffic QoS requirements are taken into account during the path selection process, and can be defined as a set of measurable quantities or parameters that describe the user's perception of the service offered by the network. Such parameters include the connection setup delay, the connection blocking probability, the loss probability, the error probability, the end-to-end transit delay and the end-to-end delay variation also referred to as jitter. Real-time traffics have more constraining requirements than non-real-time ones i.e. end-to-end delays and jitters. It is necessary to be able to give priority to the real-time packets in order to minimize these delays. Meanwhile, the packet loss must be guaranteed both for real-time and non-real-time applications which have reserved bandwidth in the network, while it is not mandatory for non-reserved type of traffic.

In this context, network users want the ability to request and be granted service level agreements (SLAs). An SLA is an agreement by the network provider to supply a guaranteed level of connectivity for a given price. The agreement is reciprocal in that the user also commits not to go beyond a certain level of network usage. The level of connectivity can be expressed in many ways, including the following: the Bandwidth (number of bits per second), the Latency (end-to-end delay), the Availability (degree of uninterrupted service), the Loss Probability, and the Security (guarantee that only the intended parties can participate in a communication).

Another important objective of the networks providers is to optimize the network resources utilization. Indeed, communication networks have at their disposal limited resources to ensure an efficient packets transmission, and while transmission costs per byte continue to drop year after year, transmission costs are likely to continue to represent the major expense of operating future telecommunication networks as the demand for bandwidth increases. More specifically, considering wide area networks (also referred to as "backbone networks"), the cost of physical connectivity between sites is frequently estimated at 80% of the overall cost. The connectivity can come in the form of a leased line, X.25 service, frame relay bearer service (FRBS), ATM bearer service (ATMBS), X.25, or a virtual private network. As higher-speed links become available, the cost per bit may decrease, but the absolute cost of links will remain significant. Therefore, there is a need to minimize the net cost per transmitted bit for all connectivity options and link speeds. Minimizing the cost per bit means squeezing the maximum possible utilization out of every link.

Thus, considerable efforts have been spent on designing flow and congestion control processes, bandwidth reservation mechanisms, routing algorithms to manage the network bandwidth and do network capacity planning i.e. optimize the configuration of the established connections (bandwidth allocated, path selected, etc.).

In order to comply with both optimizing network resources utilization and guaranteeing satisfactory SLAs to the network customers, high speed networks generally include monitoring software systems to monitor the status of their nodes and links. These monitoring systems typically rely on counters implemented at switching node level. From a network resources monitoring point of view, the most important counters are those which reflect the behavior of the "bottleneck" resources of the network because they will also reflect the end to end behavior or quality of the service delivered. In high speed networks, the switching nodes are generally oversized in terms of performances compared to the communication links. As a matter of fact, switching nodes are "one time cost" for a network owner while lines cost is recurrent for example in a month period basis in case of leased lines, and is also much higher as previously stated. In order to minimize the overall cost of a network, communication lines are sized in order to handle the traffic requirements but no more, and accordingly their throughput is always less than that of a switching node. Therefore, in a high speed network, communication links generally constitute the "bottleneck resources".

Each switching node typically includes a switching fabric and a plurality of adapter components which connect the node ongoing and outgoing links to the switching fabric. Each adapter component includes a "receive" part and a "transmit" part. The receive part receives data flow entering the node while the transmit part outputs data flow from the node towards another node. In this context, network management processes typically use counters located at the transmit part of the adapter components of the switching nodes for monitoring network resources utilization. These counters count packets or cells just before they are boarded to the outgoing links of the nodes. More specifically, the links monitored are more specifically those existing between two network switches sometimes referred to as "trunks", rather than those (logically) connecting a device on a user premise and a network access switch, sometimes referred to as "ports". Indeed, the long distance trunks are usually more expensive than local ports, and accordingly more heavily loaded in order to optimize their cost.

At the transmit part of each adapter component the susmentioned counters are incremented during the steady state process of the cells/packets by a dedicated processing unit sometimes referred to as "Picocode Processor." Periodically (e.g. every 15 minutes interval), a higher level processor herein referred to as "General Purpose Processor" imbedded in the adapter, but used for background control processing, retrieves the counters values and resets the counters. The General Purpose Processor also computes each line utilization information based on the line speed, and stores this information for further processing. Finally, a bulk statistics server, for example a workstation, independent from the network, retrieves periodically (typically every night) in each node the files containing resources utilization data, and provides to the network management operator summarized data on links utilization and network behavior. Links utilization data are typically expressed in terms of percentage of bandwidth utilized per unit of time. Links utilization is typically evaluated as follows.

Considering a link 1 whose maximum speed (i.e. bandwidth) is S cells/bytes per second (where S denotes an integer), and assuming that the counters values associated with that link are polled every T time units (where T denotes an integer, e.g., T=15 minutes). Then, the computed utilization estimation U(l) of link 1 associated with each measurement time interval T would be expressed by the following formula:

$$U(1)_T = \frac{N}{S \times T}$$

where N denotes the number of cells/packets received during measurement period T, and where T is expressed in seconds. $U(l)_T$ is expressed in percentage of link utilization.

For example, if T=15 minutes, these link utilization values computed every time interval T and periodically retrieved may be processed in the bulk statistics server to compute an "average busy hour" which represents a set of four contiguous intervals T in which the link utilization has been the higher during the day.

The bulks statistics server may also computes an "average link utilization" which is the average of link utilization values $U(l)_T$ computed during a day, several days or weeks.

In the prior art, network monitoring and network capacity planning generally rely on this average link utilization technique. However, this technique suffers from the problem that the link utilization statistics it provides do not take into account whether the traffic is "bursty" or smooth. "Bursty," as used herein, refers to variable bit rate traffic where the time between data transmission is not always the same.

Now, a given link can be highly loaded with a satisfying quality of service, e.g., at 90% of its bandwidth capacity, if the traffic that flows into it is smooth, while it should only be slightly loaded, e.g., 20%, to satisfy the same quality of service when the traffic is bursty. Indeed, if the traffic is bursty, all the nodes buffers may be instantaneously used, possibly inducing some packets/cells discarding or at least some additional cells/packets transit delays, and this is not reflected in the link utilization statistics.

Therefore, the average link utilization technique provides a rough estimate of the real limits of the network resources, and accordingly, a network monitoring and capacity planning based on such links utilization monitoring scheme is necessarily inaccurate, and does not allow to anticipate a link congestion state resulting from peaks of bursty traffic.

SUMMARY OF THE INVENTION

A main object of the invention is therefore to provide an efficient method and system of network capacity planning for use in a high speed packet switching network, which take into account the character bursty or non-bursty of the traffic flowing over the network links, thereby permitting to anticipate a link congestion state resulting from peaks of bursty traffic.

According to the preferred embodiment, there is provided a method and a system of network capacity planning for use in a high speed packet switching network. The network comprises a plurality of switching nodes interconnected through a plurality of communication links, each of the switching nodes comprises means for switching packets from at least one input link to at least one output link. Each of the output links is coupled to at least one buffer in the switching node for queuing packets before they are transmitted over the output link. The network capacity planning method of the invention comprises the following steps:

In each of the switching nodes and for each of the output links, a time distribution of the occupancy of each buffer during a predetermined monitoring time period is measured, and stored in a centralized memory location.

Then, the buffer occupancy time distribution data are retrieved from the centralized memory location in all the switching nodes, gathered and stored in a network dedicated server.

These buffer occupancy time distribution data for all the nodes are transmitted from the dedicated network server to a network monitoring center.

In the network monitoring center, the buffer occupancy time distribution data are integrated on a larger time scale, and stored.

Finally, the integrated buffer occupancy time distribution data are used to apply network capacity planning actions to the network resources.

The foregoing objects are achieved as is now described.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

In the detailed description to follow, reference will be made to the accompanying drawings where like reference numerals are used to identify like parts in the various views and in which:

FIGS. 7A–7B illustrate an efficient network capacity planning process according to the preferred embodiment that advantageously uses the buffer occupancy monitoring process of FIG. 5. FIG. 7A is a flow chart representing the capacity planning process, while FIG. 7B lists the different capacity planning actions that are taken in connection with the flow chart of FIG. 7A.

DETAILED DESCRIPTION OF THE PREFERRED EMBODIMENT

Figure 1:
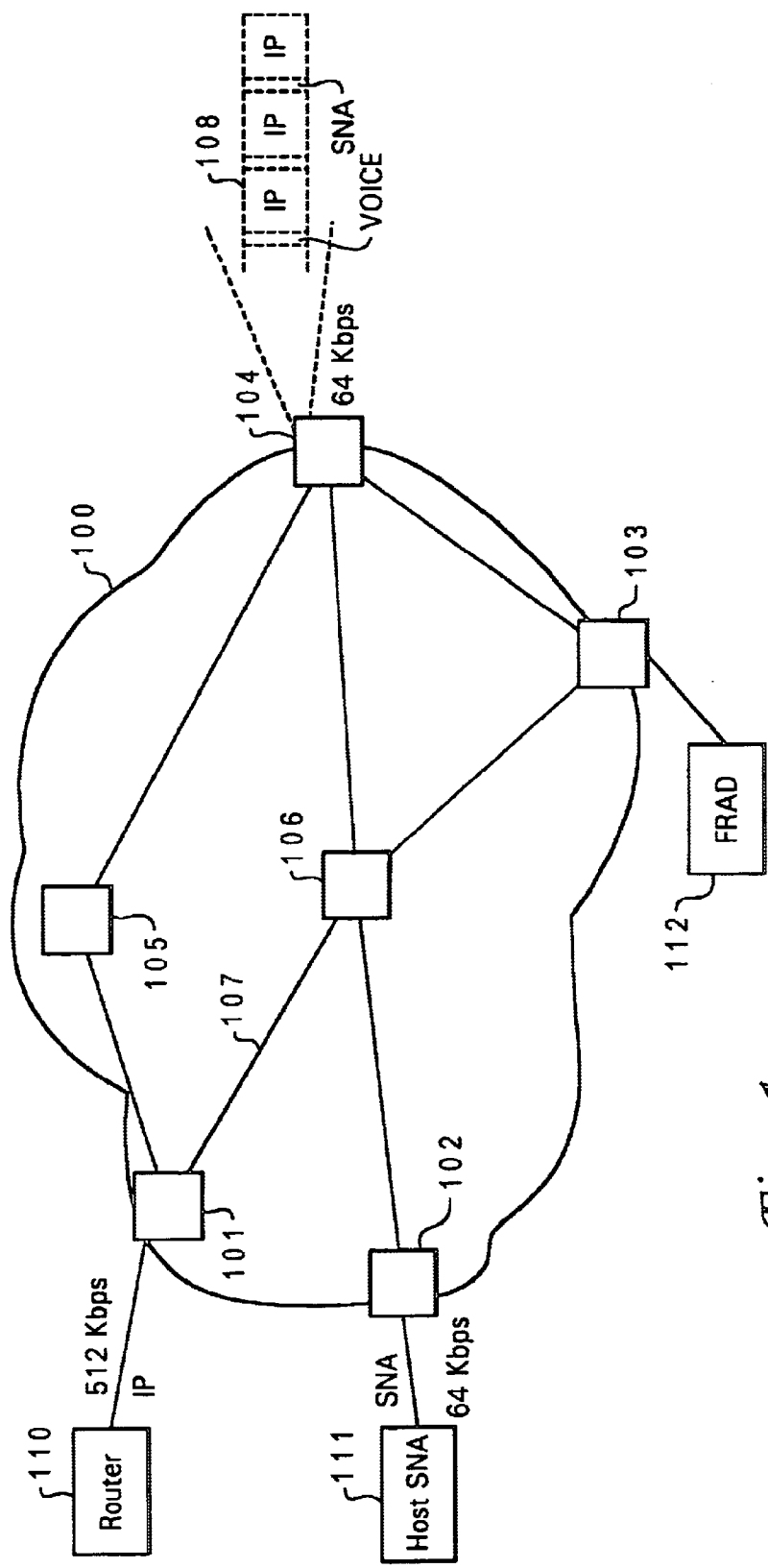
FIG. 1 is a schematic diagram of a high speed packet/cell switching network supporting different types of applications, in accordance with a preferred embodiment of the present invention.

In the detailed description to follow, the term "packet" refers to either a cell, i.e., a small fixed-size packet such as in ATM (asynchronous transfer mode) networks, or a variable size packet such as in IP or Frame Relay networks.

According to the preferred embodiment, there is provided a method and a system of network capacity planning for use in a high speed packet switching network. The network comprises a plurality of switching nodes interconnected through a plurality of communication links, each of the switching nodes comprises means for switching packets from at least one input link to at least one output link. Each of the output links is coupled to at least one buffer in the switching node for queuing packets before they are transmitted over the output link. The network capacity planning method of the preferred embodiment comprises the following steps:

In each of the switching nodes and for each of the output links, a time distribution of the occupancy of each buffer during a predetermined monitoring time period is measured, and stored in a centralized memory location.

Then, the buffer occupancy time distribution data are retrieved from the centralized memory location in all the switching nodes, gathered and stored in a network dedicated server.

These buffer occupancy time distribution data for all the nodes are transmitted from the dedicated network server to a network monitoring center.

In the network monitoring center, the buffer occupancy time distribution data are integrated on a larger time scale, and stored.

Finally, the integrated buffer occupancy time distribution data are used to apply network capacity planning actions to the network resources.

More specifically, the step of measuring in each of the switching nodes and for each of the output links, the time distribution of the occupancy of the buffers, during a predetermined monitoring time period, includes for each of the buffers, the following steps:

A plurality N (N is an integer) of buffer occupancy thresholds T(1) to T(N) are defined in order to be indicative each of a ratio of the total occupancy of the buffer.

A plurality N of buffer states ST(1) to ST(N) are also defined with each of these states being indicative of the amount of packets stored in the buffer at a given instant in relation to the thresholds T(1) to T(N).

A plurality N of counters, PT(1) to PT(N), are further defined: each of these counters, PT(i) (i is an integer comprised between 1 and N), is incremented when the buffer state is determined to be at any of the states ST(i) to ST(N). Such that, the step of measuring the time distribution of the occupancy of each of the buffers during a predetermined monitoring time period, is achieved by obtaining a set of N values PT(1) to PT(N) indicating respectively the percentage of packets that have arrived during the monitoring period while the amount of packets stored in the buffer at the packet arrival instant was equal or greater than respectively threshold T(1) to T(N).

By relying on a close monitoring, at switching node level, of the occupancy state of buffers which accordingly reflects the character bursty or non-bursty of the traffic boarded over the network links, the capacity planning method and system of the preferred embodiment therefore provide a more accurate network capacity planning scheme than the typical average link utilization technique, and which actually allows to anticipate a link congestion state resulting from peaks of bursty traffic.

Referring to FIG. 1 there is shown a typical high speed packet/cell switching network wherein connected user applications generate different types of traffic over the network. Network 100 comprises four access switching nodes 101 to 104, and two internal switching nodes 105, 106. Network nodes are interconnected by network links e.g. 107, also referred to as trunks. A router 110 transmits LAN (local area network) batch traffic in IP (Internet Protocol) format at a rate of 512 Kbps (thousands bits per second) over the network, via access node 101. A host computer 111 sends SNA (Systems Network Architecture) traffic at a rate of 64 Kbps to network access node 102. Attached to access node 103 is a Frame Relay Access Device (FRAD) 112 for transmitting voice or video data over the network. With such different applications sending traffic over the network, it is then usual in such network that a switching node transmits data from connections having different traffic profiles.

In FIG. 1, access node 104 outputs data over the same external 64 Kbps transmission line, from connections originating from router 110 (IP data), from Host computer 111 (SNA data), and FRAD 112 (voice data). Thus, the difficulty for such network is to provide each connection with the pre-specified quality of service (QOS). Indeed, some connections are very delay-sensitive as voice or video; other are not sensitive to delays but require a very low packet/cell loss in order to behave correctly, with limited retries.

Figure 2:
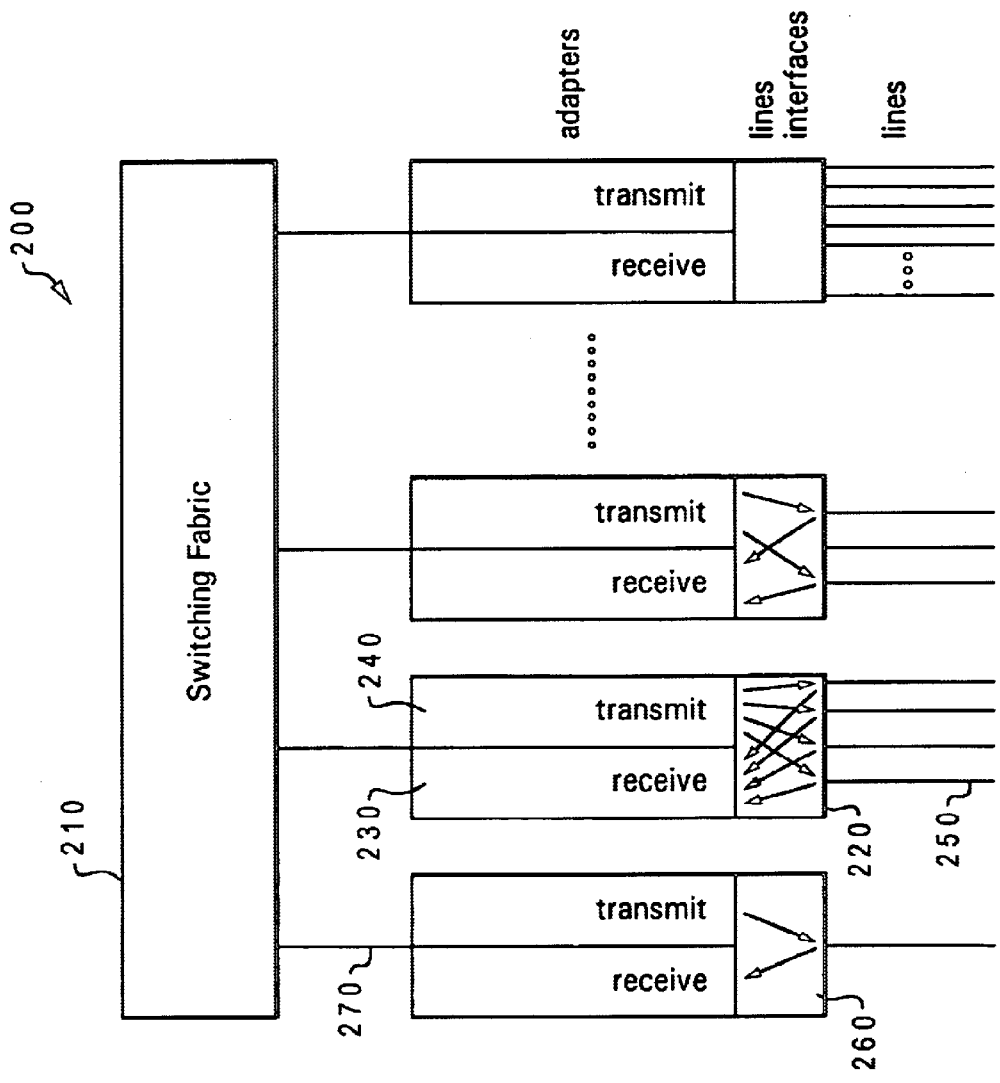
FIG. 2 is a schematic diagram of a high-level view of the internal structure of a switching node of the network of FIG. 1.

Referring now to FIG. 2, there is shown a switching node which can be either an access node or an internal node of the network. Communication to the node is accomplished by means of adapters components 220 which connect communication lines 250. Switching fabric 210 connects the various adapters at very high speed. Each adapter connects on one side to external lines via line interface couplers (LICs) 260 and on the other side to one port (270) of the cell/packet switch 210. Packets are received over the external lines 250, either a trunk i.e. an internal link or a port i.e. a network access link. Each of these packets is associated with one network connection which is either starting, transiting or terminating in this node. Accordingly, adapters can be of two different types, that is, access adapters or transit adapters. Access adapters establish data communication from outside to inside the network, i.e. from network attached data terminal equipments (DTEs) to network access nodes. Transit adapters, in the other hand, ensure data transmission between nodes inside the network. Each adapter being access or transit adapter includes two parts: a receive part 230 and a transmit part 240. Receive part 230 receives data flow entering the node while transmit part 240 outputs data flow from the node towards another node (the next node of the path) or to a destination DTE, via communications lines 250. Access adapters also support the task of call admission control, that is, the process of analyzing the parameters of a new connection in order to decide whether the connection should be accepted or not, in function of the availability of the network's resources.

Another important task performed by access adapters in their receive part, is to control the entering flow from a connection and policing the traffic in function of its compliance to the connection agreed-to traffic descriptors. This policing function comprises marking packets, as excess (red packets) or non-excess (green packets), and discarding. In the other hand, transit adapters do not include such marking function, they may only apply a selective packet discarding, and manage entering traffic e.g. by performing routing functions.

Each network node further includes a series of queuing elements for queuing incoming and departing packets. Queuing is preferably implemented at adapter level rather than at switch level because the process speed of the switch itself (switch fabric 210) is generally much higher than the process speed of an adapter. Thus, these queuing elements are essentially located at adapter level, as described hereinafter in connection with FIG. 3.

Figure 3:
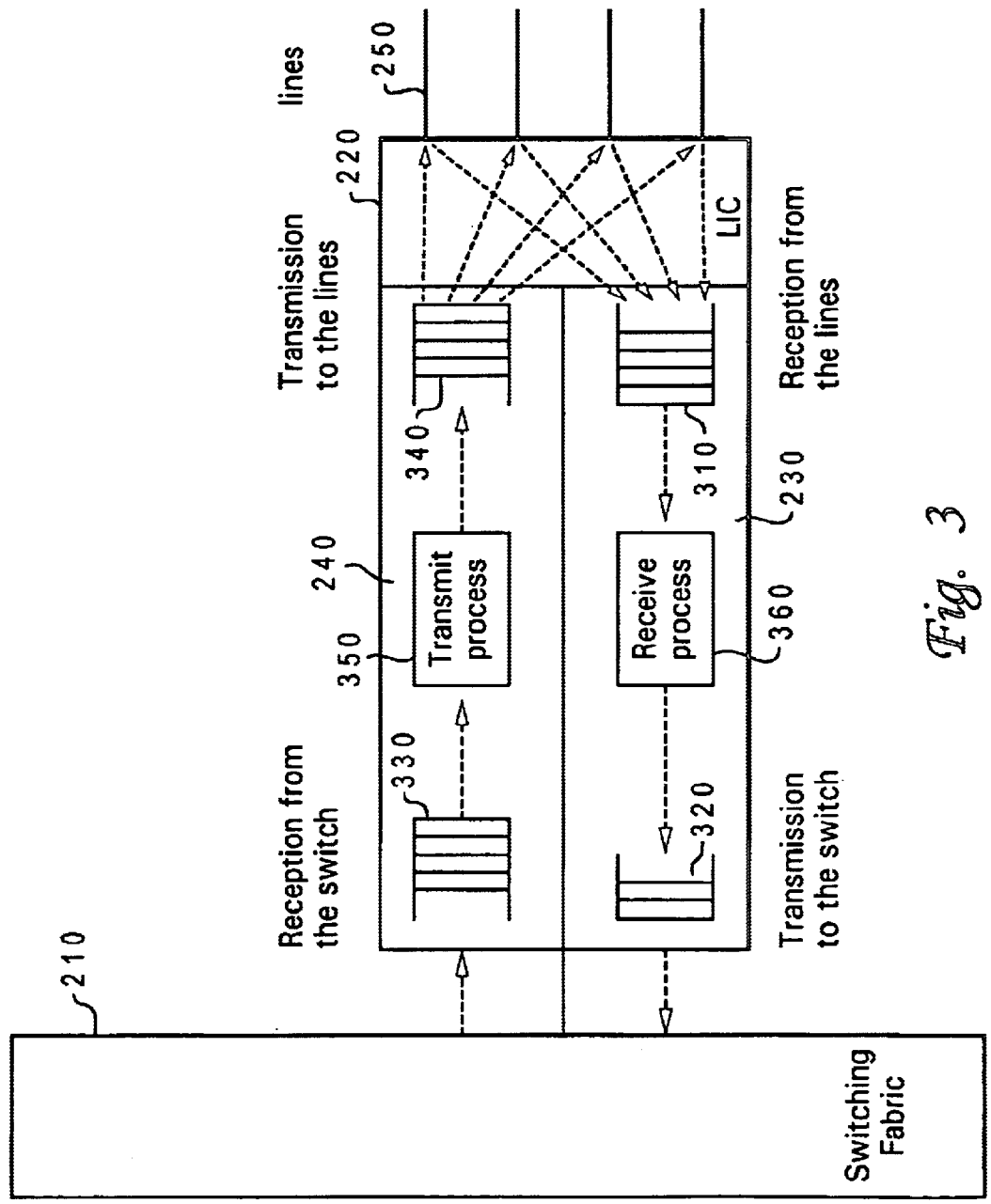
FIG. 3 is a schematic diagram showing the main queuing points of a switching node according to FIG. 2.

Referring to FIG. 3, there is shown the main queuing points of an adapter in a switching node. It is to be noted that the term "queues" stands for what is typically meant under the terms buffers, buffer memories, or queue memories; and the expression "queuing points" stands for specific locations in an adapter where such queues/buffers are implemented. In adapter 220, four queuing points can be identified, two (330, 340) are located at the transmit part 240 of the adapter, and two others (310, 320) are located at the receive part 230 of the adapter. On adapter receive part 230, once a packet has been received from one of the output lines 250, a receive process 360 is performed. Such a receive process 360 includes connection policing, routing, statistics updates, CRC (Cyclic Redundancy Checksum) checking. Depending on the architecture of the adapter, the receive process is implemented by means of a specific hardware logic, or through a processor enabled software. The software solution provides more flexibility, but it is generally less efficient in terms of performance (i.e., number of packets processed per time unit) than the specific hardware solution, and consequently a queue 310 may be implemented for queuing incoming packets arriving faster than being processed by receive process element 360. Generally this queuing is limited to compensate for potential bursts of packets. A second queue 320 of adapter receive part 230 may be implemented to compensate for potential congestion of switch 210, but this queuing is negligible as switches are generally designed to operate faster than adapters.

Now regarding the adapter transmit side, a packet that passes from switch 210 to adapter transmit part 240, is firstly queued in switch output queue 330 before it is processed in transmit process element 350. Transmit process element 350 determines the destination output line (250) to transmit packets over. Queue 330 is thus intended to compensate for a lower processing rate of transmit process 350 compared to the arrival rate of incoming switched packets, depending on the implementation type (software/hardware) of the adapter. Generally, when the implementation is software, the adapter processor running the code is designed to sustain a predetermined transmit packet rate larger than the corresponding line speed, and queuing of packets in queue 330 is limited to compensate for potential bursts of packets. Before they are transmitted over destination output lines, packets are queued in adapter output queuing point 340.

As network links are generally designed to sustain the traffic characteristics offered and no more (for cost-effective reasons), when congestion occurs the first resources to be saturated are generally the links. Consequently, adapter output queues constitute the major queuing element in the switching node to compensate for congestion at link level. In view of the foregoing reason, the implementation of the presently preferred embodiment focuses on adapter output queuing point 340 that is, the switching node output transmission queues.

The importance of output queuing point 340 is expressed through the number of different traffic management features proposed at this level by the different network providers. Output queuing point 340 comprises a plurality of queues (i.e. buffer memories) which may achieve per priority queuing, per connection queuing, fairness queuing etc. or a combination thereof.

Figure 4:
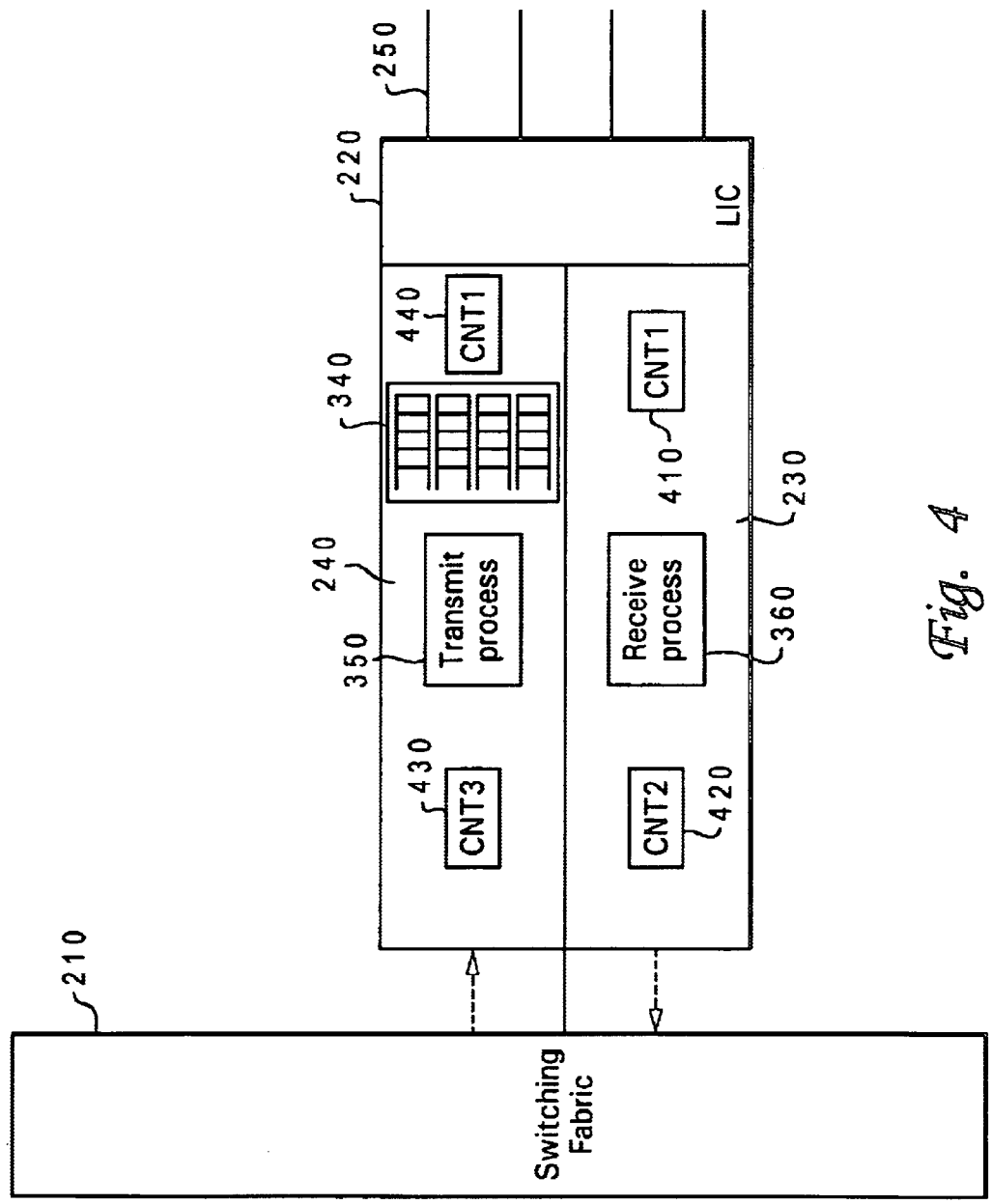
FIG. 4 is a schematic diagram showing the location where packet/cell counters are implemented in a switching node according to FIG. 2.

Now referring to FIG. 4, there is shown the location where packet/cell counters are typically implemented in a switching node according to FIG. 2. In the receive part 230 of adapter 220, a first set of counters, receive counters 410 (CNT1), is responsible for counting incoming packets, as well as counting erroneous packets. Still in adapter receive part 230, a second set of counters, accept/discard counters 420 (CNT2), are coupled to the policing process performed within receive process 360. The policing process is the function which verifies the compliance of the traffic supported by a given connection to the contract subscribed (SLA). If the connection traffic is above the agreed-upon traffic then packets may be discarded or tagged. Thus, counters 420 are responsible for counting packets that are tagged or discarded, as well as those that are accepted. Now, in transmit part 240 of adapter 220, counters are also implemented: a third set of counters 430 (CNT3) is responsible for counting packets as soon as they are received from switching fabric 210, as well as packets discarded due to overflow of the corresponding buffers (queues 330 of FIG. 3). Finally a fourth set of counters 440 (CNT4) is implemented for counting packets when they leave queues 340, just before they are boarded over transmission links 250.

All the four sets of counters are implemented globally per adapter, then per port, per class of service, and possibly per connection. As previously stated, from a network resources monitoring point of view, the most important counters are those which reflect the behavior of the "bottleneck" resources of the network because they will also reflect the end to end behavior or quality of the service delivered. These counters are accordingly counters 440 (CNT4). However these counters provide numbers that do not take into account the possible burstiness of the traffic and therefore allow to compute link utilization statistics that lack accuracy.

According to the preferred embodiment, there is provided a new technique of network resources monitoring based on queues occupancy monitoring rather than merely counting packets that are boarded to the outgoing links of the nodes, as typically performed by counters 440 (CNT4). The principle is to measure the occupancy of each of the "bottleneck" queues, i.e., queues 340 each time a packet is admitted to one of these queues. While this technique will be described hereinafter with reference to one memory queue, it should be understood that each of the memory queues 340 is monitored in the same manner.

Buffer Occupancy Monitoring Principle

The principle of buffer/queue occupancy monitoring relies on defining for each queue 340 a plurality N (N is an integer) of thresholds T(1) to T(N) expressed in number of packets or bytes stored in the queue. For ATM networks they would be expressed in number of cells, while for packets of variable size such as for Frame Relay networks, they would be expressed in number of bytes. The amount of cells/bytes stored in the queue at a given instant, is referred herein to as the expression "queue size" and noted Qsize. Thresholds T(1)–T(N) are chosen so as to correspond to different percentages of occupancy of the queue, function of its total capacity. In relation with these N thresholds, a number N of queue states, ST(1)–ST(N), are defined with regard to the comparison of the queue size with the thresholds T(1)–T(N). Queue states ST(1)–ST(N) are defined as follows:

| ST(1): | Queue state when T(1) <= Qsize < T(2); |
|---|---|
| ... | ... |
| ST(p): | Queue state when T(p-1) <= Qsize < T(p); |
| ... | ... |
| ST(N-1): | Queue state when T(N-1) <= Qsize < T(N); |
| ST(N): | Queue state when Qsize >= T(N). | where "<=" stands for "less or equal to", and ">=" stands for "greater or equal to".

Further, a number N of counters, PT(1)–PT(N), are implemented. Each counter PT(i) (with i comprised between 1 and N) is incremented when the queue state (Queue_State) is found to be at any of the states ST(i) to ST(N).

In the preferred embodiment of the invention, four (N=4) thresholds are defined: T(1), T(2), T(3), T(4) which correspond to 5%, 20%, 40% and 70% of the total queue capacity. Associated to these thresholds, queue states ST(1) to ST(4) are thus defined as follows:

ST(1): Queue state when T(1)<=Qsize<T(2);
ST(2): Queue state when T(2)<=Qsize<T(3);
ST(3): Queue state when T(3)<=Qsize<T(4);
ST(4): Queue state when Qsize>=T(4).

Four counters PT(1)–PT(4) are implemented. For example, as explained above, counter PT(2) would be incremented if queue state is determined to be any of the states ST(2), ST(3), ST(4).

The overall process of queue occupancy monitoring will now be described in connection with FIG. 5. In the preferred embodiment of the invention, this process is implemented in the form of a computer program within the transmit process 240 (FIG. 3) in the adapter transmit part 220.

Figure 5:
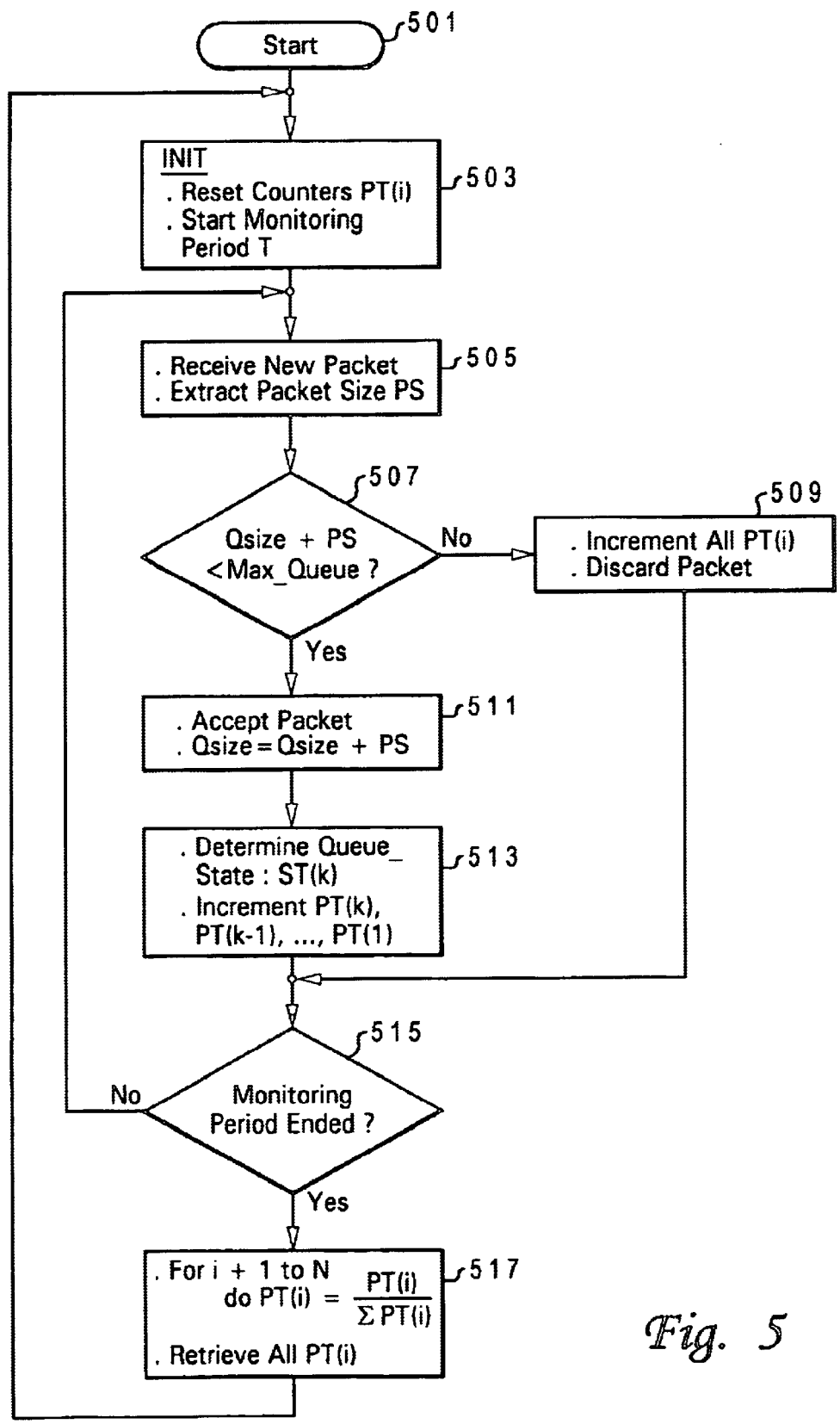
FIG. 5 is a flow chart illustrating a buffer occupancy monitoring process according to the preferred embodiment.

In FIG. 5, the process of queue occupancy monitoring according to the preferred embodiment starts at start box 501. Then, at box 503, an INIT step is performed where all the N counters PT(i) with i comprised between 1 to N are initialized to zero. Still in box 503, a new monitoring time interval (period) T is started. In next box 505, when a new packet is received from the switching fabric, its size PS is extracted from its header. It should be noted that in case of ATM cells, the cell size is fixed and the queues sizes are expressed in number of cells. Then, decision box 507 is entered to check if the queue can accept this packet. That is, current queue size (number of cells/bytes currently stored in the queue) increased with incoming packet size PS should be less than the maximum capacity, Max_Queue, of the queue. If not (NO) box 509 is entered in which all counters PT(i) with i from 1 to N are incremented, and finally the new packet is discarded as it cannot be stored in the queue. The process then continues with decision box 515. Conversely, if the new packet can be enqueued (YES), box 511 is entered in which the new packet is accepted in the queue, and accordingly current queue size (Qsize) is overridden with new packet size (PS). Then, box 513 is entered to determine the state of the queue (Queue_State) with regard to the queue states ST(1)–ST(N) defined above. When the queue state, ST(k) (with k being an integer comprised between 1 and N) is determined, then counters PT(1) to PT(k) are incremented. The process continues with decision box 515, where it is tested whether monitoring period T is completed or not. If not (NO), the process recycles to box 505 to receive a new packet. If so (YES) the process ends with box 517 in which all counters values PT(1) to PT(N) are divided by:

$$\Sigma PT(i)$$

With $\Sigma PT(i)=PT(1)+PT(2)+ \ldots +P$

That way, final values PT(i) obtained express each the percentage of packets that have arrived during monitoring period T while the queue was in any of the states ST(i) to ST(N). In other words: each value PT(1) to PT(N) indicates respectively the percentage of packets that have arrived during monitoring period T while the queue size (Qsize) was equal or greater than respectively threshold T(1) to T(N).

Finally in box 517, final values PT(1) to PT(N) are retrieved by the General Purpose processor of the adapter, so that these values are available to be polled by the bulk statistics server. After box 517 is complete, the process recycles at INIT box 503 to initialize a new monitoring period. It should be noted that period T should be chosen such as to avoid counters overflow. In the preferred embodiment of the invention, period T is chosen to be 15 minutes.

In parallel with the foregoing process described in connection with FIG. 5, each time a packet has been successfully transmitted from the queue over an outgoing link (250), the queue size (Qsize) is accordingly decremented by the size of the packet.

Thus, after each monitoring period T and for each queue (340), it is obtained an evaluation of the time distribution of the queue occupancy with reference to the thresholds T(1) –T(N) chosen during the monitoring period (T) considered. This queue occupancy evaluation is available through a set of N values: PT(1) to PT(N). Each value PT(i) indicates the percentage of packets that have arrived during monitoring period T while the queue size (Qsize) was equal or greater than threshold T(i), with T(i) expressed in percentage of the total queue capacity. It is therefore clear that such evaluation of the time distribution of the queue occupancy takes into account the character bursty or non bursty of the traffic flowing over the link monitored while it is not reflected in the prior art average link utilization technique.

Figure 6:
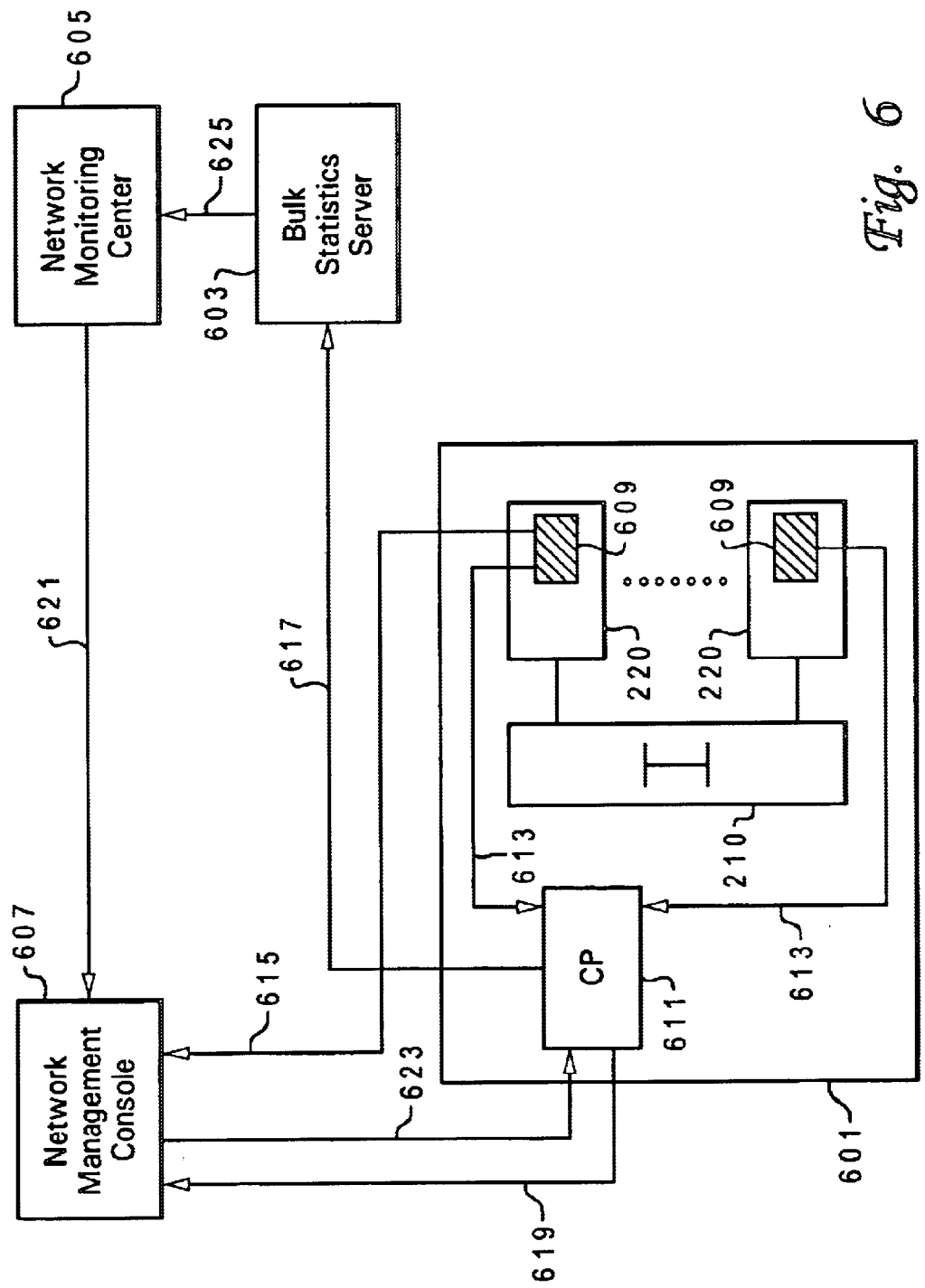
FIG. 6 is a schematic block diagram illustrating a general network management architecture of a high speed packet switching network.

Now, with reference to FIG. 6, there is shown a schematic block diagram illustrating a general network management architecture in which counters values at node level are retrieved and used to build network statistics and do capacity planning. In FIG. 6, only one network node 601 is represented for simplicity of illustration. In node 601 a switching fabric 210 connects a plurality of adapters 220. Still in node 601, a Control Point processor (CP) 611 provides the network control functions. Adapters 220 include memory locations 609 where adapter counters values are stored. As illustrating by arrows 613, Control Point processor 611 centralizes periodically the different counters values measured during the measurement periods. These data are periodically sent to the bulk statistics server 603 as shown by arrow 617 which collects in background all the statistics from all the network nodes, usually at night. Statistics server 603 sends periodically or on demand the statistics files containing data for all the network resources to a network monitoring center 605, as shown by arrow 625. In the network monitoring center 605, human operators use these files to monitor the network resources and take the appropriate network capacity planning actions. Network capacity planning actions are performed through a network management console 607 typically a personal computer or workstation as illustrated by arrow 621. The network management console 607 transmits the network capacity planning commands to the Control Point processor 611 of the network nodes concerned, as illustrated by arrow 623. Lastly, the counters values stored in memory locations 609 of node adapters 220 may also be accessed directly in real time by a human operator through network management console 607.

In the network management context described above in connection with FIG. 6, there will now be described how the buffer occupancy monitoring process of the preferred embodiment described above in connection with FIG. 5 may be advantageously used to do an efficient network capacity planning.

Figure 7A:
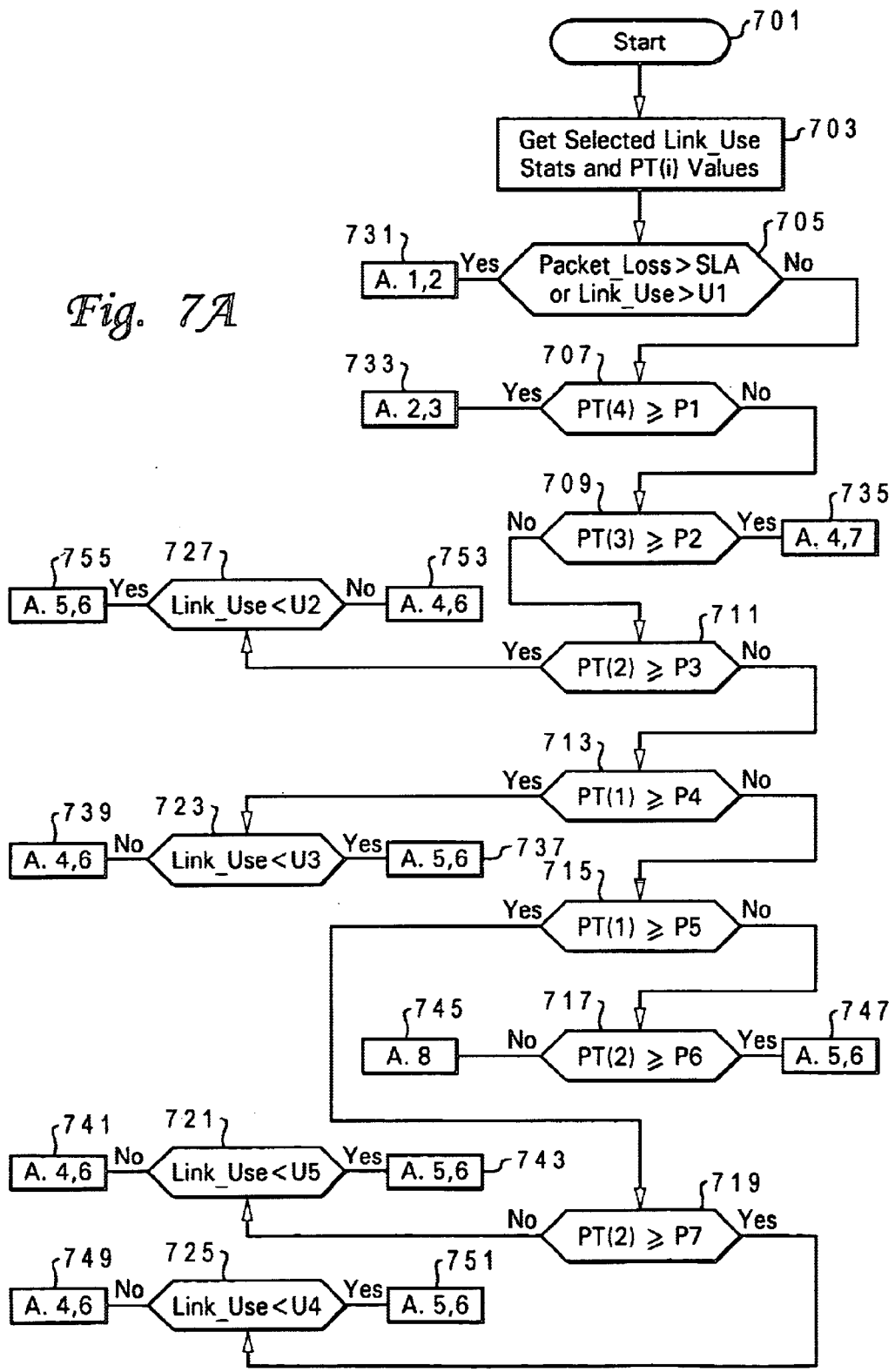

With reference to FIGS. 7A–7B there is illustrated an efficient network capacity planning according to the preferred embodiment that advantageously uses the buffer occupancy monitoring process of FIG. 5. FIG. 7A is a flow chart representing the capacity planning process, while FIG. 7B lists the different capacity planning actions that are taken in connection with the flow chart of FIG. 7A.

It should be noted that while the capacity planning process illustrated by FIGS. 7A–B shows that decisions are taken from observing both the average link utilization statistics and the queues occupancy counters values PT(i) according to the preferred embodiment of the invention, a capacity planning process based only on the monitoring of the counters values PT(i) can also be implemented.

The process illustrated by FIGS. 7A–7B is implemented in the form of computer programs which run automatically in a monitoring-dedicated computer in the network monitoring center (605). Statistics values concerning the network resources nodes/links are gathered first in the bulk statistics server (FIG. 6, 603), and then automatically retrieved every night from the statistics server to be stored as files in mass memories (e.g. disk memories) in the network monitoring center (605). As previously stated, these statistics values include both the average link utilization statistics as typically computed and the link-associated buffer occupancy statistics which are computed as explained above in connection with FIG. 5.

All statistics values retrieved from the bulk statistics server are automatically integrated (e.g. averaged) on a larger time scale (e.g. per day, week or month) in the network monitoring center, before they are used for capacity planning. From these averaged statistics values, the capacity planning process may be triggered either manually by a human operator, or automatically if the statistics values reach predefined thresholds.

Referring to FIG. 7A the efficient network capacity planning process according to the preferred embodiment is initiated, starting at start box 701, whenever the automated process of the network links monitoring is activated. At that time, box 703 is entered, a link to be monitored is selected and the corresponding statistics values are retrieved from storage in the network monitoring center. The link associated statistics values include:

the associated daily or weekly average link utilization statistics ("Link_Use")

the associated link buffer occupancy statistics ("PT(i) values"), i.e., the averaged PT(i) values (PT(1) to PT(4) in the preferred embodiment), with each value PT(i) indicating the percentage of packets that have arrived during the long term period considered while the queue size (Qsize) was equal or greater than threshold T(i);

the link packet loss ratio ("Packet_Loss"), i.e. the percentage of packet discarded due to congestion during the long term period considered.

Then, decision box 705 is entered where it is determined whether the link Packet_Loss is greater than the SLA (service level agreement) requirements associated with the connections boarded on the link, or the Link_Use is greater than a first predetermined value U1. If link Packet_Loss is larger than the SLA, it means that the link is already not capable of providing a good level of service with regard to the SLA because it is overloaded. If Link_Use is greater than the first predetermined link use value U1 which is equal to 85% in the preferred embodiment of the invention, it means that the risk of potential packet discard is quite high and decision should be taken to prevent a potential congestion. Therefore, if one or both of the foregoing cases apply (YES), decisions are taken through entering box 731 where actions A1 and A2 are performed to reroute some of the connections presently boarded over the link (A1, FIG. 7B) and to stop boarding new connections (A2, FIG. 7B).

Conversely, if not (NO), decision box 707 is entered to test buffer occupancy value PT(4). If PT(4) is greater or equal to a first predetermined buffer occupancy ratio P1 (with T(4)=70% and P1=2% in the preferred embodiment) then it means that the percentage of packets PT(4) that have arrived during the monitoring time period while the queue occupancy (Qsize) was equal or greater than T(4) is greater of equal to P1. A value P1=2% should be considered high compared to the levels of SLA currently guaranteed, with a packet loss probability ratio around $10^{-6}$–$10^{-8}$.

In this case (YES), decisions are taken through entering box 733 where actions A2 and A3 to stop boarding new connections (A2) and to keep the link closely monitored (A3) to test the SLA compliance.

Conversely, if not (NO), decision box 709 is entered to test buffer occupancy value PT(3). If PT(3) is greater or equal to a second predetermined buffer occupancy ratio P2 (with T(3)=40% and P2=10% in the preferred embodiment) then it means that the percentage of packets PT(3) that have arrived during the monitoring time period while the queue occupancy (Qsize) was equal or greater than T(3) is greater of equal to P2. This indicates that the buffers used are very exceptionally close to their maximum capacity, but they are used between T(3) (40%) and T(4) (70%) quite often. It is reasonable then to consider that connections which may increase the burstiness and consequently the buffers occupancy should not be boarded. However, connections which are of real time type and/or non-bursty can increase the link load without modifying the behavior of the buffers occupancy. Accordingly, these connections can be accepted in the network on the link monitored, as long as their bandwidth remains small compared to the link capacity.

Returning to decision box 709, in this case (YES), decisions are taken through entering box 735 where actions A4 and A7 are performed to stop boarding new bursty connections (A4), and to permit boarding new non-bursty connections at a predetermined condition (A7). In the preferred embodiment of the invention, this condition is that the non-bursty connections must have subscribed bandwidth which is less than 1/20 of the overall link capacity.

Conversely, if PT(3) is less than P2 (NO) in box 709, decision box 711 is entered to test buffer occupancy value PT(2). If PT(2) is greater or equal to a third predetermined buffer occupancy ratio P3 (with T(2)=20% and P3=20% in the preferred embodiment), then it means that the percentage of packets PT(2) that have arrived during the monitoring time period while the queue occupancy (Qsize) was equal or greater than T(2) is greater of equal to P3. In this situation (711, YES), it appears that there is some margin in the buffers occupancy which should allow to accept some more bursty connections. However a verification of the average link use (Link_Use) is more advisable, as shown by entering decision box 727 in which Link_Use is compared to a second predetermined value U2 which is equal to 60% in the preferred embodiment of the invention.

Then, if Link_Use is less than second predetermined link use value U2 (727, YES), this means that the link is already optimized in terms of price per bit transported, and the risk of packets discarding in relation with an increase of the link utilization is too important. Accordingly, only non-bursty connections are accepted as shown by entering action box 755 and performing action A6. However, as the link use is less than U2, it is worth to increase the number of connections boarded on the link so as to reduce the price per bit transported. Accordingly, action A5 in box 755 is also performed to allow bursty connections to be boarded at the condition that their bandwidth allocated remains small compared to the link capacity i.e., in the preferred embodiment, if their bandwidth (CIR in Frame Relay) is less than 1/30 of the overall link capacity.

Returning to decision box 711, if PT(2) is less than third predetermined buffer occupancy value P3 (NO), then decision box 713 is entered to compare buffer occupancy value PT(1) to a fourth predetermined buffer occupancy ratio P4, with T(1)=5% and P4=20% in the preferred embodiment. If PT(1) is greater or equal to P4 (YES), then it means that the percentage of packets PT(1) that have arrived during the monitoring time period while the queue occupancy (Qsize) was equal or greater than T(1) is greater of equal to P4. In that case, a further link use test is performed through entering box 723, in which Link_Use is compared to a third predetermined value U3. U3 is equal to 65% in the preferred embodiment of the invention.

If Link_Use is less than U3 (YES) then the link utilization is not too high, and bursty connections may be accepted at the condition that their bandwidth allocated remains small compared to the link capacity. Accordingly, box 737 is entered to perform action A5, that is, bursty connections may be accepted if their allocated bandwidth is less than 1/30 of the overall link capacity. In box 737 action A6 is also performed to accept any new non-bursty connections.

Conversely, in box 723, if Link_Use is greater or equal to U3 (NO), box 739 is entered to perform actions A4 and A6 whereby no new bursty connection is accepted anymore (A4), while any new non-bursty connection is accepted (A6).

Returning to decision box 713, if PT(1) is less than P4 (NO), decision box 715 is entered to perform a further test on PT(1). In box 715, PT(1) is compared to a fifth predetermined buffer occupancy ratio P5. P5 is equal to 10% in the preferred embodiment.

If PT(1) is found equal or greater than P5 (YES), then an additional test is performed on PT(2) as shown by entering box 719, in which PT(2) is compared to a seventh predetermined buffer occupancy ratio P7. P7 is chosen equal to 5% is the preferred embodiment.

In decision box 719, If PT(2) is determined to be equal or greater than P7 (YES), it means that the buffers are occupied during an important proportion of the monitoring time period. Thus, decision box 725 is entered to compare the average link utilization Link_Use to a fourth predetermined value U4, which is set to 5% in the preferred embodiment.

If Link_Use is less than U4 (YES), thus the link is not too loaded, then action box 751 is entered to perform actions A5 and A6 whereby: any non-bursty connection may be accepted (A6), while bursty connections may be accepted at the condition that their allocated bandwidth is not too large (A5). This condition is that their bandwidth must be less than 1/30 of the overall link capacity, in the preferred embodiment.

Conversely, in box 725, if Link_Use is greater than U4 (NO), action box 749 is entered to perform actions A4 and A6 whereby any new bursty connection will be rejected (A4), while any non-bursty connection may be boarded (A6).

Back to decision box 719, if PT(2) is determined to be less than P7 (NO), decision box 721 is entered to compare the average link utilization Link_Use to a fifth predetermined value U5, which is set to 5% in the preferred embodiment.

If Link_Use is less than U5 (YES), thus the link is not too loaded, then action box 743 is entered to perform actions A5 and A6 whereby: any non-bursty connection may be accepted (A6), while bursty connections may be accepted at the condition that their allocated bandwidth is not too large (A5). This condition is that their bandwidth must be less than 1/20 of the overall link capacity, in the preferred embodiment.

Conversely, in box 721, if Link_Use is greater than U5 (NO), action box 741 is entered to perform actions A4 and A6 whereby any new bursty connection will be rejected (A4), while any non-bursty connection may be boarded (A6).

Now, returning to decision box 715, if PT(1) is found less than P5 (NO) (with T(1)=5% and PS=10%) then an additional test is performed on PT(2) as shown by entering decision box 717, in which PT(2) is compared to a sixth predetermined buffer occupancy ratio P6. P6 is chosen equal to 5% is the preferred embodiment.

If PT(2) is determined to be equal or greater than P6 (YES), this means that the buffers are almost empty in average (since PT(1) is less than P5), except when peaks (bursts) of traffic occur, in which case buffer occupancy threshold T(2) is exceeded. Therefore, as the risk of buffer congestion is very low, all non-burtsy connections can be accepted as shown by entering box 747 to perform action A6. As shown by also performing action A5 in box 747, bursty connections can be accepted too at the low restrictive condition that their allocated bandwidth be less than 1/10 of the overall link capacity.

Finally, back to decision box 717, if PT(2) is found less than P6 (NO) (P6=5%), then the link can be considered as being idle, as PT(1) is simultaneously less than P5 (branch NO in box 715). Accordingly, no connection acceptance limitation is required, as shown by performing action A8 in action box 745.

While the invention has been described in terms of a preferred embodiment, those skilled in the art will recognize that the invention can be practiced with variations and modifications. Therefore, it will be understood by those skilled in the art that various changes in form and detail may be made therein without departing from the spirit and scope of the invention.

What is claimed is:

1. A network capacity planning method for use in a high speed packet switching network having a plurality of switching nodes interconnected through a plurality of communication links, each of the switching nodes having means for switching packets from at least one input link to at least one output link, each of the at least one output link being coupled to at least one buffer in the switching node for queuing packets before they are transmitted over the output link, comprising the steps of:

in each of the switching nodes and for each of the output links, measuring a time distribution of the occupancy of the at least one buffer during a predetermined monitoring time period; and storing the buffer occupancy time distribution data measured for each output link in a centralized memory location;

retrieving the buffer occupancy time distribution data stored in the centralized memory location in all the switching nodes, gathering and storing the retrieved data in a dedicated network server;

transmitting the buffer occupancy time distribution data for all the nodes from the dedicated server to a network monitoring center;

in the network monitoring center, integrating the buffer occupancy time distribution data on a larger time scale, and storing the integrated buffer occupancy time distribution data; and using the integrated buffer occupancy time distribution data to apply network capacity planning actions.

2. The network capacity planning method of claim 1, wherein the step of measuring in each of the switching nodes and for each of the output link, the time distribution of the occupancy of the at least one buffer during a predetermined monitoring time period, includes, for each of the at least one buffer:

defining a plurality N, with N being an integer, of buffer occupancy thresholds T(1) to T(N), each of the thresholds being indicative of a ratio of the total occupancy of the buffer;

defining a plurality N of buffer states ST(1) to ST(N), each of the states being indicative of the amount of packets stored in the buffer at a given instant in relation to the thresholds T(1) to T(N);

defining a plurality N of counters, PT(1) to PT(N), each of which, PT(i) with i being an integer comprised between 1 and N, being incremented when the buffer state is determined to be at any of the states ST(i) to ST(N).

whereby the step of measuring the time distribution of the occupancy of the at least one buffer during a predetermined monitoring time period is achieved by obtaining a set of N values PT(1) to PT(N) indicating respectively the percentage of packets that have arrived during the monitoring period while the amount of packets stored in the buffer at the packet arrival instant was equal or greater than respectively threshold T(1) to T(N).

3. The network capacity planning method of claim 2, wherein the number N of buffer occupancy thresholds, of buffer states, and counters is four, and wherein the buffer states ST(1) to ST(4) are defined as follows:

ST(1): Buffer state when T(1)<=Qsize<T(2);
ST(2): Buffer state when T(2)<=Qsize<T(3);
ST(3): Buffer state when T(3)<=Qsize<T(4);
ST(4): Buffer state when Qsize>=T(4), wherein "<=" stands for "less or equal to", and ">=" stands for "greater or equal to", and where "Qsize" refers to the amount of packets stored in the buffer at a given instant.

4. The network capacity planning method of claim 3, wherein the buffer occupancy thresholds T(1) to T(4) are indicative respectively of 5 percent, 20 percent, 40 percent, and 70 percent of the total occupancy of the buffer.

5. The network capacity planning method of claim 1, wherein the step of integrating the buffer occupancy time distribution data on a larger time scale in the network monitoring center includes averaging the buffer occupancy time distribution measured for each predetermined time period measurement over a long time period, before they are available to be used for applying capacity planning actions.

6. The network capacity planning method of claim 5, wherein the long time period is a day, a week, or a month.

7. The network capacity planning method of claim 2, wherein the step of using the integrated buffer occupancy time distribution data to apply network capacity planning actions includes:

for each of the output link, comparing each one of the plurality N of integrated counters values, PT(1) to PT(N), to respectively at least one predetermined buffer occupancy ratio (FIG. 7A, P1–P7), the result of the comparison determining a type of capacity planning action to be applied to the link.

8. The network capacity planning method of claim 1, further comprising the steps of:

computing and storing in the network monitoring center an average link utilization data for each of the links, the average link utilization data relying on the counting of packets during the predetermined monitoring time period before they are boarded on the link; and combining, for each communication link, the average link utilization data and the buffer occupancy time distribution data to determine the type of network capacity planning action to be applied to the link.

9. The network capacity planning method of claim 8, wherein for each network output link, the percentage of packet discarded (Packet_Loss) during the predetermined monitoring time period is used, in combination with the average link utilization data and the buffer occupancy time distribution data, to determine the type of network capacity planning action to be applied to the link.

10. The network capacity planning method of claim 1, wherein the network capacity planning actions to be applied to each of the output links, includes at least one of:

rerouting the connections boarded on the link;
stop boarding new connections on the link;
keeping the link monitored;
stop boarding new bursty connections on the link;
boarding new bursty connections if a predetermined condition is fulfilled;
boarding any new non-bursty connection;
boarding new non-bursty connections if a predetermined condition is fulfilled; and
boarding any new connection.

11. The network capacity planning method of claim 1, wherein the network capacity planning actions are applied to the plurality of communication links through a network management console, the network management console transmitting commands corresponding to the capacity planning actions to the centralized memory location in each of the switching nodes.

12. A network capacity planning method for use in a high speed packet switching network having a plurality of switching nodes interconnected through a plurality of communication links, each of the switching nodes having means for switching packets from at least one input link to at least one output link, each of the at least one output link being coupled to at least one buffer in the switching node for queuing packets before they are transmitted over the output link, comprising the steps of:

in each of the switching nodes and for each of the output links, measuring a time distribution of the occupancy of the at least one buffer during a predetermined monitoring time period;

transmitting the buffer occupancy time distribution data for all the nodes to a network monitoring center;

in the network monitoring center, integrating the buffer occupancy time distribution data on a larger time scale, and storing the integrated buffer occupancy time distribution data; and managing the capacity and utilization of the network according to the integrated buffer occupancy time distribution data.

13. A data processing system network comprising:

a plurality of switching nodes interconnected through a plurality of communication links, each of the switching nodes having means for switching packets from at least one input link to at least one output link, each of the at least one output link being coupled to at least one buffer in the switching node for queuing packets before they are transmitted over the output link;

means for measuring a time distribution of the occupancy of the at least one buffer during a predetermined monitoring time period, in each of the switching nodes and for each of the output links;

means for transmitting the buffer occupancy time distribution data for all the nodes to a network monitoring center;

means for integrating the buffer occupancy time distribution data on a larger time scale, and storing the integrated buffer occupancy time distribution data; and means for managing the capacity and utilization of the network according to the integrated buffer occupancy time distribution data.

* * * * *